Oct. 21, 1958  G. A. LYON  2,857,022
WHEEL STRUCTURE
Filed Oct. 6, 1954  4 Sheets-Sheet 1
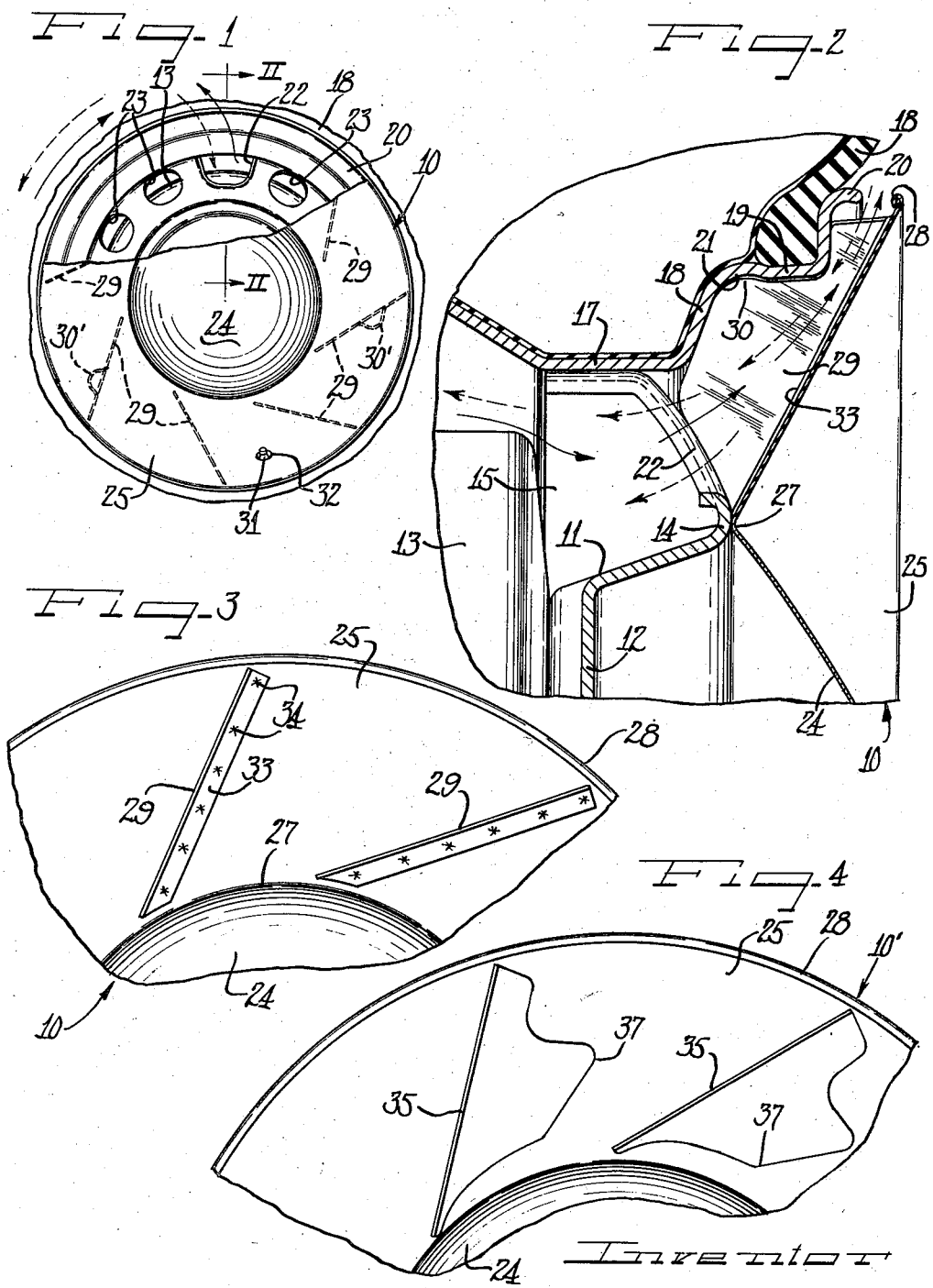
Inventor
George Albert Lyon

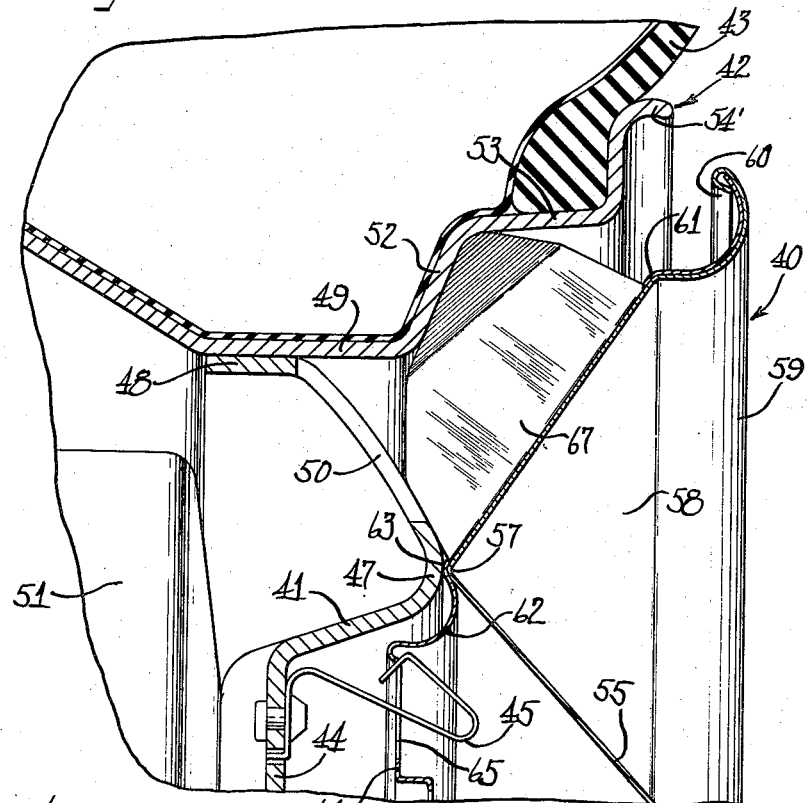
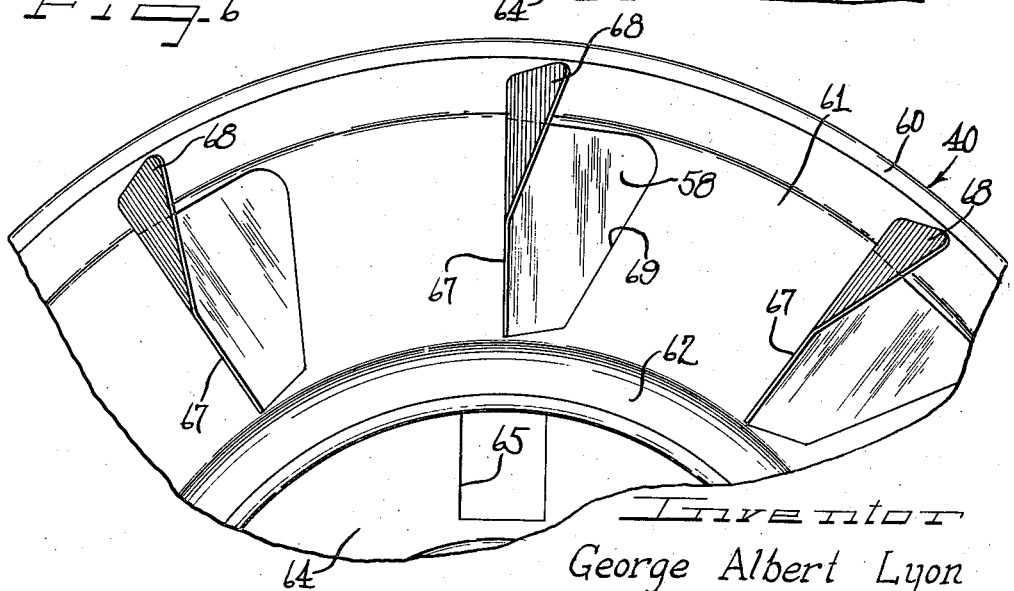
Inventor
George Albert Lyon

Oct. 21, 1958    G. A. LYON    2,857,022
WHEEL STRUCTURE
Filed Oct. 6, 1954    4 Sheets-Sheet 3
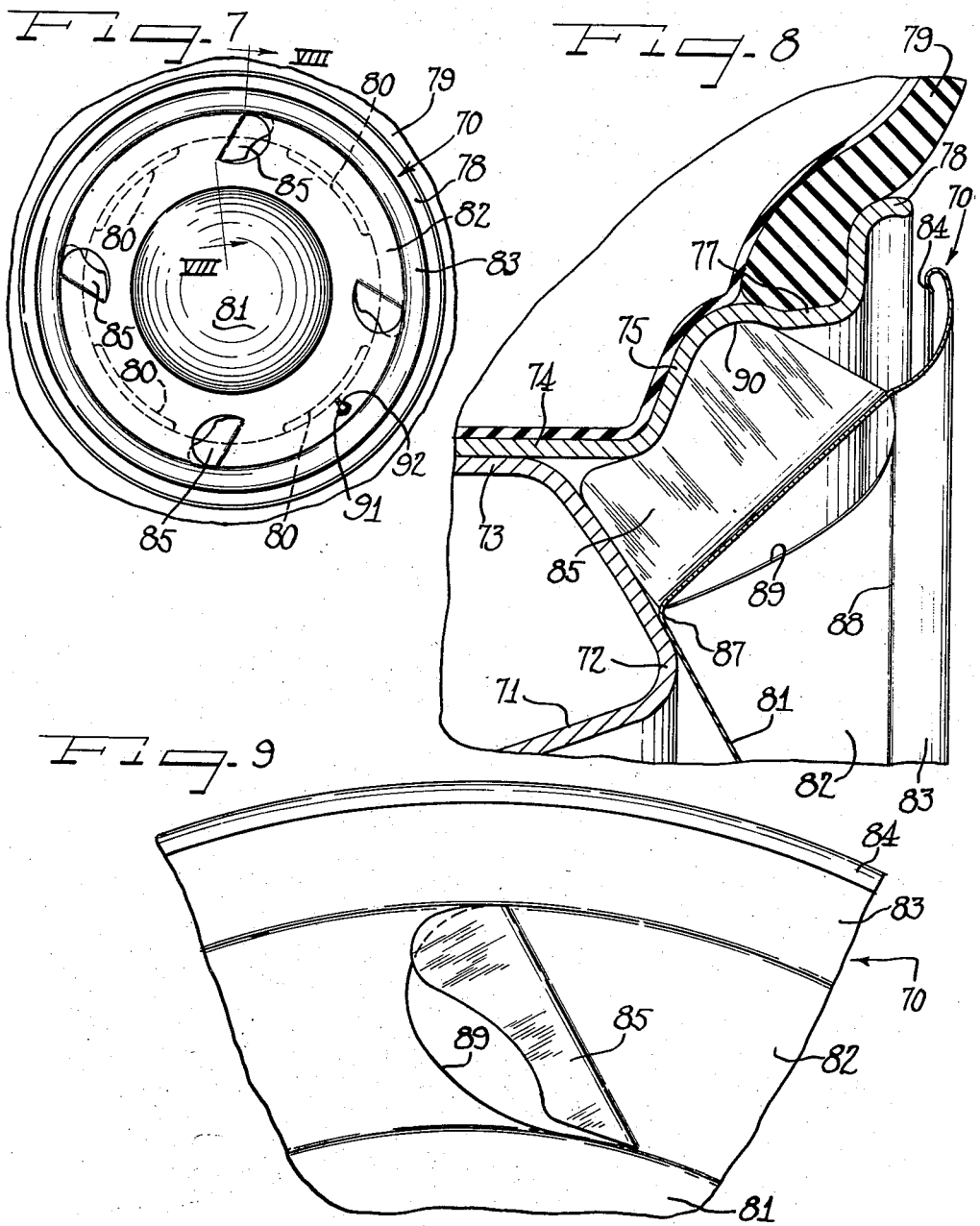
Inventor
George Albert Lyon

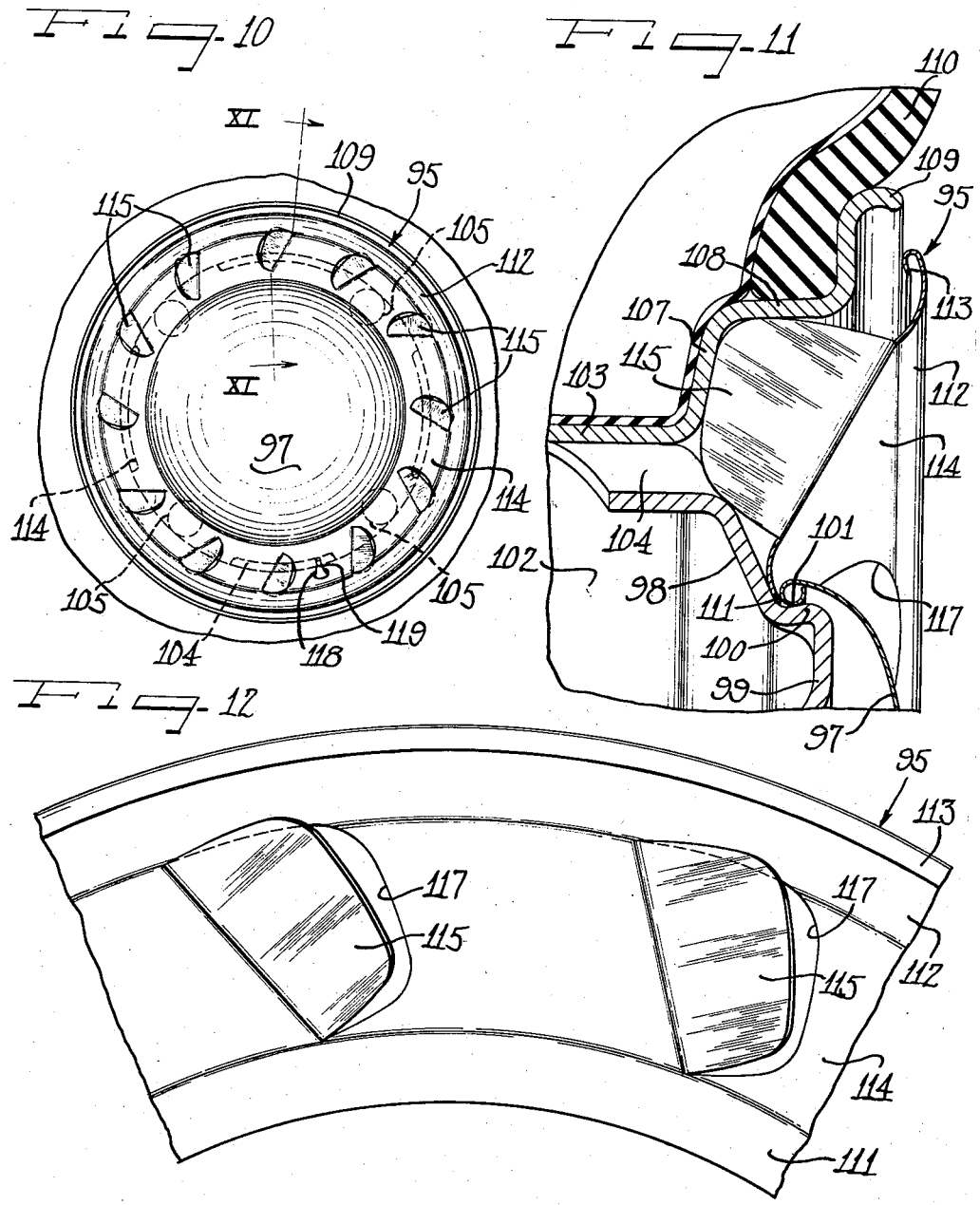

United States Patent Office 2,857,022
Patented Oct. 21, 1958

2,857,022

WHEEL STRUCTURE

George Albert Lyon, Detroit, Mich.

Application October 6, 1954, Serial No. 460,553

8 Claims. (Cl. 188—264)

The present invention relates to improvements in wheel structures and more particularly concerns the ornamental and protective covering of the outer sides of vehicle wheels.

An ever more serious problem in the automobile industry resides in the tendency toward overheating and thereby unduly rapidly wearing out of the brakes. This comes about by the constant tendency toward heavier vehicles, larger tires, smaller wheels, and larger brakes, or at least brakes with larger braking surfaces.

In the running of automobile wheels, especially at higher speeds, there is a tendency for the air within the perimeter of the tire rim to stagnate, apparently by reason of development of at least a slight vacuum condition resulting from centrifugal force drawing outwardly at both the inner and outer sides of the tire rim simultaneously as the wheel rotates.

It is therefore highly desirable to effect some artificial movement of air through the wheel, and more especially to effect movement of air in a manner to have cooling effect upon the brake drum of the vehicle.

An important object of the present invention is to provide a wheel structure including novel means on a cover for disposition at the outer side of the wheel for effecting positive air circulation through the wheel in operation.

Another object of the invention is to provide an air circulation promoting cover arrangement for vehicle wheels which will effect movement of air either from the inner side of the wheel toward the outer side or from the outer side of the wheel toward the inner side.

A further object of the invention is to provide in a wheel structure having cover means at the outer side thereof, novel air circulation promoting structure defining pockets behind the margin of the cover and in association with the tire rim cooperative with openings through the wheel for effecting strong brake drum cooling air circulation through the wheel.

Still another object of the invention is to provide a cover for disposition at the outer side of a vehicle wheel in snap-on, pry-off relation and including wheel engaging and air circulation promoting vane structure thereon.

Other objects, features and advantages of the present invention will be readily apparent from the following detailed description of certain preferred embodiments thereof taken in conjunction with the accompanying drawings, in which:

Figure 1 is an outer side elevational view of a wheel structure embodying features of the invention, with a portion of the cover broken away for illustrative purposes;

Figure 2 is a fragmentary enlarged radial sectional view taken substantially on the line II—II of Figure 1;

Figure 3 is a fragmentary rear elevational view of the cover of Figures 1 and 2;

Figure 4 is a fragmentary rear elevational view of a modification of the cover;

Figure 5 is a fragmentary radial sectional view through a modified wheel structure;

Figure 6 is a fragmentary rear elevational view of the cover of Figure 5;

Figure 7 is an outer side elevational view of a wheel structure embodying a further modification;

Figure 8 is an enlarged fragmentary radial sectional detail view taken substantially on the line VIII—VIII of Figure 7;

Figure 9 is a fragmentary rear elevational view of the cover of Figures 7 and 8;

Figure 10 is an outer side elevational view of a wheel structure showing still another modification;

Figure 11 is a fragmentary generally radial sectional view taken substantially on the line XI—XI of Figure 10; and Figure 12 is a fragmentary rear elevational view of the wheel trim member of Figures 10 and 11.

As shown in Figures 1, 2 and 3 a cover 10 is provided for disposition at the outer side of a vehicle wheel comprising a wheel body 11 which may be of the disk spider type having a central bolt-on flange 12 by which the wheel is adapted to be secured in suitable manner as by means of bolts (not shown) to an axle structure including a brake drum 13. The wheel body may be provided with a generally axially outwardly projecting annular nose bulge 14 intermediately thereof while at its outer periphery the body is provided with a generally axially inwardly directed attachment flange 15 by which it is attached in suitable manner permanently to a base flange 17 of a tire rim of the drop center multi-flanged type adapted to support a pneumatic tire and tube assembly 18 but which may if preferred be a tubeless tire.

From the base flange 17 of the tire rim extends an outer side flange 18 directed generally radially outwardly and sloping axially outwardly, which merges with an intermediate generally axially outwardly extending and radially outwardly sloping flange 19 leading to a generally radially and then axially outwardly extending terminal flange 20. At juncture of the intermediate flange 19 with the side flange 18, a generally radially inwardly opening annular groove 20 may be provided.

To enable circulation of air through the wheel for cooling the brake drum 13, openings are provided in the wheel. In the present instance a series such as four equally spaced openings 22 is provided, comprising flanged notches or indentations in the margin of the body 11. In addition, a series of holes 23 through the wheel body adjacent the tire rim between the wheel openings 22 may be provided for increasing the total flow area for air circulation through the wheel cover for cooling the brake drum 13.

According to the present invention the cover 10 is provided with means for effecting positive directional movement of air through the wheel in the operation of the wheel in service. To this end the cover 10 comprises a metallic disk, such as stainless steel or brass or the like drawn to shape to provide a central or crown portion 24 and an annular divergently related radially outer portion 25 joining the crown portion divergently on an intermediate juncture rib 27 of a diameter to engage in assembly against the nose bulge 14.

The outer annular cover portion 25 extends in generally radially and axially outwardly sloping relation into overlying spaced relation to the tire rim and has an underturned edge extremity reinforcing and finishing bead 28 which is adapted to lie in opposed spaced relation to the tip of the terminal flange.

For effective positive circulation of air behind the annular cover portion 25 and through the wheel openings 22 and 23, air circulation vanes 29 are provided which, in addition, serve as retaining means for the cover. To this end, the vanes 29 are constructed and arranged to extend diagonally across the back of the annular cover portion 25 so that they are angled in one circumferential direction. Deviation from the radial of the vanes 29 is preferably substantial and may be close to tangential to the circle described by the juncture rib 27. At their inner ends the vanes 29 are shaped to conform generally to and closely approach the wheel body 11. At their axial inner and their radially outer edges the vanes 29 are constructed to conform generally to the tire rim flanges so as to engage closely therewith. For retaining the cover on the wheel, radial projections 30 are provided on the radially outwardly directed edge portions of the vanes for engagement in snap-on, pry-off resiliently tensioned gripping relation within the tire rim groove 21. At their radial outer extremities the vanes 29 extend close to the bead 28 and overlie the tire rim terminal flange 20. Through this arrangement, the vanes 25 provide therebetween, in cooperation with the cover portion 25 and the wheel parts, chambers that are substantially isolated from each other but have communication through the wheel through the several wheel openings 22, 23. Such chambers are open at the periphery of the cover between the reinforced edge 28 and the terminal flange 20.

With the arrangement of the vanes 29 as described it has been found that highly efficient movement of air through the wheel is effected in the rotation of the wheel in either direction. For example, when the wheel, in the forward movement of the vehicle in service, rotates clockwise as indicated by solid directional arrow in Figure 1, the circumferentially angled vanes 29 apparently have a strong aspirating effect on the air within the sub-chambers defined thereby in the large annular chamber between the cover portion 25 and the tire rim as well as the adjacent apertured portion of the wheel body. This aspirating effect is assisted by centrifugal movement of air during rapid rotation of the wheel and tending to move the air toward the periphery of the tire rim and more particularly outwardly through the substantial peripheral gap between the outer edge of the cover and the terminal flange 20 of the tire rim. As a result of this suction movement of the air outwardly strong air cooling circulation or draft of air is caused to move from the inner side of the wheel about and past the brake drum 13 and out through the wheel openings 22 and 23, to be discharged through the sub-chambers between the vanes 29 and out the peripheral gap between the cover and the tire rim.

On the other hand, should it be desired to effect movement of the air from the outer side of the wheel toward the inner side, as indicated by the broken line arrows in Figure 2 and by the broken line directional arrow in Figure 1, rotational movement of the wheel in service counterclockwise as viewed in Figure 1 results in the vanes 29 acting as scoops to direct the air from the outer periphery of the cover and tire rim generally inwardly through the subchambers defined by the vanes and then through the substantial wheel openings 22 and 23. Thence the air circulates in cooling relation about the brake drum 13 and exhausts at the inner side of the wheel.

It is desirable that the cover 10 be held effectively against turning on the wheel, so as to avoid distortion of a valve stem 31 that may project through a valve stem aperture 32 in the cover portion 25. Rotation of the cover in the circumferential direction in which the vanes 29 are angled is quite effectively prevented by the expanding clutch relationship of the retaining edges and more particularly the retaining lobes 30 of the vanes 29 in engagement with the tire rim. That is, the stronger the torque force tending to turn the cover in that circumferential direction, the stronger will the retaining edges of the vanes grip the tire rim and thus resist such turning. To prevent turning in the opposite direction, means are provided, herein comprising angling of certain of the retaining lugs or lobes 30 in the opposite circumferential direction as indicated at 30' to become effective in response to torque forces in the circumferential direction toward which the retaining lobes 30' have been angled. Depending upon the size and weight of the cover and other environmental characteristics, two or more of the reversely circumferentially angled lobes 30' may be used.

As shown in Figs. 2 and 3, the vanes 29 are provided as separate members attached in suitable fashion to the inner face of the cover portion 25. For example, the vanes 29 may be provided with angular flanges 33 along their axially outer margin bearing against the inner face of the outer cover portion 25 and secured thereto as by means of spot welding 34, riveting or the like.

If preferred, however, the cover may be provided with vanes that are struck out of the cover portion 25 as shown in Figure 4 wherein the cover is identified as 10' but portions thereof that are identical with the cover 10 are similarly numbered. In the cover 10', the vanes are identified as 35 and are struck out of the cover portion 25, leaving corresponding apertures 37 therein. These apertures 37 may be of additional air circulation assistance in that air may move therethrough in the rotation of the wheel and in the operation of the circumferentially angled vanes 35 in promoting air circulation through the cover. In other essential respects the vanes 35 are of similar structure and function similarly as the vanes 29.

In the modification of Figures 5 and 6, a cover 40 is adapted to be applied to the outer side of a vehicle wheel including a wheel body 41 and a multi-flange drop center tire rim 42 adapted to support a pneumatic tire assembly 43. The wheel body comprises a disk spider metallic stamping having a central dished bolt-on flange 44 supporting a series of generally gooseneck spring clips 45. Intermediately the wheel body 41 has an annular axially outwardly directed nose bulge 47 the radially outer side of which slopes toward an attachment flange 48 attached in suitable fashion to a base flange 49 of the tire rim. Openings 50 through the wheel body intermediate the nose bulge 27 and the attachment flange 48 provide for circulation of air for cooling a brake drum 51 which comprises part of an axle structure to which the bolt-on flange 44 is attached.

At the outer side of the tire rim 42 a side flange 52 extends generally radially and axially outwardly from the base flange 49 and merges with an intermediate flange 53 directed generally axially outwardly and sloping radially outwardly to juncture with a terminal flange 54.

The cover 40 in the present instance comprises a two part structure comprising an outer plate of suitable material such as stainless steel or brass or the like provided with a central crown portion 55 divergently related at a more or less sharp annular axially inwardly directed juncture rib 57 to a generally radially and axially outwardly sloping cover portion 58 having at its radially outer margin a transversely arcuate annular marginal reinforcing and finishing rib 59 with a marginal extremity turned under to provide a reinforcing and finishing bead-like flange 60.

Behind the outer cover plate is provided a cover retaining plate 61 nested behind the cover portions 58 and 59. At its outer margin the cover retaining plate 61 has its extremity locked retainingly in assembly with the outer cover plate by the underturned flange 60. At its radially inner portion the inner plate 61 has an annular rib-like portion 62 disposed in the radially outer marginal portion of the cover crown 55 and joining the inner plate body at a groove 63 within which the outer cover plate rib 57 is nested. Inwardly from the rib 62 is provided an inset flange portion 64 which overlies the bolt-on flange 44 in spaced relation and has appropriate clip receiving apertures 65 through which the retaining clips 45 are engageable in snap-on, pry-off relation to engage at the radially outer margins defining the apertures 65 for retaining the cover in axial position on the wheel with the inwardly directed rib structure 57, 63 resting against the nose bulge 47 and with the radially outer portion of the cover disposed in spaced relation to the wheel body and the tire rim and at the radially outer marginal portion 59 of the cover defining a substantial gap in the terminal flange 54 and the cover.

For promotion of air circulation behind the cover and through the wheel openings 50 the inner cover plate 61 is provided with a series of vane members 67 which may be generally radially disposed, but with generally radially and axially directed free portions thereof angled in one circumferential direction as shown at 68 and generally complementary to and cooperating closely with the side flange 52 and the intermediate flange 53 of the tire rim. At their radial edges the vanes 67 cooperate closely with the wheel body 41 at the radial outer side of the nose bulge 47. By preference the vanes 67 are struck out of the inner cover plate 61, thereby leaving substantial openings 69 therein which in assembly with the outer cover plate are closed by the portion 58 thereof. Through the arrangement of vanes 67 as shown, air circulation in the rotation of the cover is effected substantially as described in connection with Figures 1 and 2, depending upon the direction of rotation of the wheel. That is, when the wheel is rotated in the opposite circumferential direction from that in which the vane portions 68 are angled, air movement is aspirated from the inner side toward the outer side of the wheel through the sub-chambers defined by the vanes 67 in the main chamber between the cover and the tire rim and the wheel body and into which the wheel openings 50 communicate. When the wheel is rotated in the direction of circumferential angling of the vane portions 68 movement of air from the outer side of the wheel through the gap between the cover and the tire rim is from the outer side of the wheel toward the inner side through the openings 50.

Having reference now to Figures 7, 8 and 9, a cover 70 is constructed and arranged to be applied to the outer side of a vehicle wheel comprising a disk spider body 71 provided with an intermediate axially outwardly extending annular nose bulge 72 and having at its outer margin a generally axially inwardly directed attachment flange 73 by which the body is secured to a base flange 74 of a tire rim of the multi-flange drop center type having in addition an outer side flange 75, an intermediate flange 77 and a terminal flange 78. A pneumatic tire and tube assembly 79 is adapted to be supported by the tire rim.

At suitable intervals, such as four, the attachment flange 73 is inset to provide openings 80 through the wheel whereby circulation of air through the wheel to assist in cooling a brake drum (not shown) associated with the wheel is enabled.

The cover 70 is constructed and arranged to cooperate with the wheel openings 80 for accelerating movement of air therethrough in operaiton. To this end, the cover 70 may be constructed from a single piece of sheet material such as stainless steel or brass drawn to shape and comprises a central crown portion 81 of a diameter to overlie the wheel body 71 and of a diameter to overlie the nose bulge 72 where a generally radially and axially outwardly directed annular cover portion 82 extends divergently into spaced overlying relation to the outer side of the tire rim. At its outer extremity the cover portion 82 is provided with an annular outwardly convex rib structure 83 which is adapted to overlie the terminal flange 78 of the tire rim in substantial air gap spaced relation. An underturned bead-like reinforcing flange 84 finishes the radially outer extremity of the rib-like marginal portion 83 of the cover.

For promoting air circulation within the annular gap chamber behind the outer cover portion 82, 83, and for retaining the cover on the wheel, a series of wing-like retaining finger vanes 85 is provided, herein comprising four equidistantly spaced ones of the vanes 85 arranged to cooperate with the tire rim and the wheel body at the radially outer side of the nose bulge 72 to divide the annular chamber into four equal compartments corresponding to and communicating with the respective wheel openings 80. By preference each of the finger-vanes 85 is struck out from the outer annular cover portion 82 between the juncture rib 87 with the crown 81 and the juncture rib 88 between the cover portion 82 and the marginal cover portion 83. Thereby openings 89 are provided in the cover portion 82.

The vanes 85 are attached along an axially outer margin integrally in one piece to the cover portion 82 and all of the vanes are angled obliquely in one circumferential direction and are also angled inwardly in planes that are oblique to the axis of the cover and also oblique to radial lines from the center of the cover.

At their radial innermost edges vane fingers 85 cooperate closely with the wheel body 71 while at their axially inner and radial outer edges the vane fingers cooperate closely with the tire rim for thereby substantially closing off the several compartments between the vanes within the gap between the cover and the tire rim.

For retaining the cover on the wheel the vanes 85 are provided with radially outwardly projecting lobe-like junctures between the radially outer and axially inner edges thereof, retainingly engageable under resilient tension within a generally radially inwardly opening groove 90 in the intermediate flange 77 at juncture thereof with the side flange 75 of the tire rim. Through this arrangement the cover is adapted to be pressed into position by camming of the retaining edges of the vanes 85 inwardly along the intermediate flange 77 until the same snap into the groove 90. In this position, the cover is held bottomed against the nose bulge 72. To remove the cover a pry-off tool may be inserted behind the outer underturned flange 84 and the reinforcing shoulder 88 and pry-off leverage force applied to disengage the finger vanes 85.

Proper location of the finger vanes 85 with respect to the wheel openings 80 is assured or gauged by provision of a valve stem aperture 91 between a pair of the vanes for registration with a valve stem 92 which may be located in line with one of the wheel openings 80. Accordingly, when the cover is applied to the wheel with the valve stem opening 91 registering with the valve stem 92, the compartments behind the cover into which a space between the tire rim and the cover is divided will be substantially uniformly related to the respective wheel openings. Hence, in the rotation of the wheel in the direction of circumferential angling of the vanes 85, air will be caused to move from the outer side toward the inner side of the wheel through the wheel openings 80, while when the wheel rotates in the opposite direction there will be an aspirating effect promoting movement of air from the inner side of the wheel toward the outer side through the wheel openings 80. In addition, of course, movement of air through the openings 89 in the cover enhances the volume of air that may move through the wheel.

If a cover assembly comprising a trim ring and hub cap assembly is preferred, the modification of Figures 10, 11 and 12 may be utilized. This includes a trim ring 95 and a hub cap 97 arranged to cooperate in assembly for substantially covering the outer side of a wheel including a wheel body 98 having an intermediate annular nose bulge 99 provided with cover retaining bumps 100 substantially according to the teachings of my Patent 2,445,330, dated July 20, 1948. For engagement in snap-on, pry-off relation with the bumps 100 the hub cap 97 has a resiliently springy marginal bead 101.

At its outer margin the wheel body 98 has an attachment flange 102 attached in a suitable manner to a base flange 103 of a tire rim and provided at suitable intervals such as four with inset portions affording air circulation openings 104 through the wheel. In addition at equally spaced intervals between the wheel openings 104, which may be four in number, the wheel body 98 may be provided with supplementary air circulation openings 105.

The tire rim is of the multi-flange drop center type having a side flange 107 extending generally radially and axially outwardly from the outer side of the base flange 103 and merging with a generally axially outwardly but radially outwardly sloping intermediate flange 108 that leads into a generally radially outwardly and then axially outwardly directed terminal flange 109. The flanges of the tire rim are related to support a tire and tube assembly 110.

The trim ring member 95 is constructed and arranged to lie in substantially concealing relation to the wheel body 98 between the bumps 100 and the tire rim, and also to lie in spaced covering relation to the outer side of the tire rim. To this end, the trim ring 95 comprises an annular body made of sheet metal or strip of suitable kind such as stainless steel or brass and extending obliquely in a generally radially and axially outward direction, with an inner marginal flange 111 engageable against the wheel body immediately radially outwardly adjacent to the retaining bumps 100 so that in assembly the hub cap bead 101 will press axially inwardly against the flange 111 and thereby retain the trim ring on the wheel. At its radially outer margin the trim ring is provided with an annular convex rib 112 having an underturned outer edge reinforcing and finishing flange 113.

Between the fairly narrow outer marginal rib 112 and the inner marginal flange 111, the body of the trim ring 95 provides a substantially frusto-conical annular area 114 which is provided with a series of inwardly directed air circulation promoting vane or wing flanges 115. These vanes 115 are struck out from the cover area 114, leaving air circulation openings 117.

Each of the vane member 115 is attached along an axially outer margin integrally in one piece to the trim ring and is angled in one circumferential direction substantially obliquely and disposed in a plane which is oblique not only to the axis of the cover assembly but also to radial lines from the center of the cover assembly. At their several free edges, the vanes 115 are constructed to be cooperatively related fairly closely to the wheel body and the side and intermediate flanges of the tire rim so as to divide the annular space behind the trim ring into a plurality of separated compartments which communicate with the respective wheel openings 104 and 105 and with the gap between the outer underturned flange 113 of the trim ring and the terminal flange 109 of the tire rim.

Registration of the several compartments into which the vanes 115 divide the space behind the trim ring, with the several wheel openings is assured by a valve stem opening 118 through which a valve stem 119 is registered in assembly.

It will be appreciated that in the rotation of the wheel, the vanes 115 will as the wheel is turned in the circumferential direction of the angling of the vanes promote circulation of air from the outer side toward the inner side of the wheel through the several compartments behind the trim ring and the wheel openings, while when the wheel is turned in the opposite circumferential direction there will be an aspirating effect which causes the air to move from the inner side toward the outer side of the wheel through the wheel openings and the compartments behind the trim ring, thereby assisting in cooling a brake drum (not shown) with which the wheel is associated in service.

Although the vanes 115 are not primarily relied upon for retaining the trim ring 95 on the wheel, it is preferred that the radially outwardly facing edges of the vanes make close frictional engagement under at least some resilient tensioning against the intermediate flange 108 so as to have some retaining effect upon the trim ring at least sufficient to maintain the trim ring in place on the wheel when the hub cap 97 is pried free from the wheel.

It will be understood that modifications and variations may be effected without departing from the scope of the novel concepts of the present invention.

I claim as my invention:

1. In a wheel structure including a tire rim and a wheel body with openings in the wheel body adjacent the tire rim for brake drum cooling air circulation therethrough, a cover for the outer side of the wheel having a portion affording with the tire rim and the portion of the wheel body having the openings an annular chamber of substantial cross-sectional area directed generally radially and axially outwardly and with a substantial gap opening between the outer terminal of the tire rim and the cover, and a series of vanes in said annular chamber dividing the same into a plurality of sub-chambers communicating with said openings and with said gap, said vanes being disposed in circumferentially angular relation to the tire rim for aspirating action on air in said sub-chambers in the rotation of the wheel in the opposite circumferential direction from that in which the vanes are angled and for air scooping action on the air in said sub-chambers to move it from the outer side toward the inner side of the wheel in the rotary movement of the wheel in the circumferential direction in which the vanes are angled, said vanes having generally radially extending edge portions retainingly engageable in press-on, pry-off relation with the tire rim.

2. In a wheel structure including a tire rim and a wheel body with openings adjacent the tire rim for circulation of air through the wheel body for brake drum cooling purposes, a cover for disposition at the outer side of the wheel including air circulation promoting vanes having edge portions angled in respectively oppositely circumferential directions engageable with the tire rim and retaining the cover against turning on the wheel.

3. In a wheel cover for disposition at the outer side of a vehicle wheel having air circulation openings therethrough, a cover member having therebehind a series of generally circumferentially angled air circulation promoting vanes having edges engageable with a tire rim flange, certain of said edges being angled in the generally circumferential direction of the vanes and others of said edges being angled in the opposite circumferential direction so that said edges will cooperate with a tire rim to retain the cover against turning on the wheel.

4. In a wheel structure including a tire rim and a wheel body with openings through the wheel adjacent juncture of the wheel body and tire rim, a cover for disposition at the outer side of the wheel including an annular portion having an inner margin for close juncture cooperation with the wheel body radially inwardly from the wheel openings and diverging therefrom to an outer margin arranged to lie in substantially spaced air gap relation to the terminal portion of the tire rim and to afford an annular air gap between the tire rim and the wheel body adjacent to the tire rim and communicating with the wheel openings, and a plurality of vanes on the inner side of said cover portion extending from a radially inner end within the divergent juncture of the annular cover portion and the wheel body to a radially outer end adjacent to the terminal portion of the tire rim and between said ends conformably following the wheel body and the tire rim as well as the annular cover portion for thereby dividing the annular space into a plurality of substantially isolated chambers communicating with the wheel openings and thereby avoiding stagnation of air in said space in the running of the wheel, said vanes being circumferentially angled to have an aspirating effect in rotary motion of the wheel in the opposite direction from the angling of the vanes and an air scooping effect in rotary motion of the wheel in the direction of angling of the vanes.

5. In a wheel structure including a tire rim and a wheel body with openings through the wheel adjacent juncture of the wheel body and tire rim, a cover for disposition at the outer side of the wheel including an annular portion having an inner margin for close cooperation with the wheel body radially inwardly from the wheel openings and an outer margin arranged to lie in substantially spaced air gap relation to the terminal portion of the tire rim and to afford an annular air gap between the tire rim and the wheel body adjacent to the tire rim and communicating with the wheel openings, and a plurality of vanes on the inner side of said cover portion dividing the annular space into a plurality of chambers communicating with the wheel openings, said vanes being circumferentially angled to have an aspirating effect in rotary motion of the wheel in the opposite direction from the angling of the vanes and an air scooping effect in rotary motion of the wheel in the direction of angling of the vanes, the cover comprising a full disk cover and the vanes having edges retainingly engageable in press-on, pry-off relation with the tire rim.

6. In a wheel structure including a tire rim and a wheel body with openings through the wheel adjacent juncture of the wheel body and tire rim, a cover for disposition at the outer side of the wheel including an annular portion having an inner margin for close cooperation with the wheel body radially inwardly from the wheel openings and an outer margin arranged to lie in substantially spaced air gap relation to the terminal portion of the tire rim and to afford an annular air gap between the tire rim and the wheel body adjacent to the tire rim and communicating with the wheel openings, and a plurality of vanes on the inner side of said cover portion dividing the annular space into a plurality of chambers communicating with the wheel openings, said vanes being circumferentially angled to have an aspirating effect in rotary motion of the wheel in the opposite direction from the angling of the vanes and an air scooping effect in rotary motion of the wheel in the direction of angling of the vanes, said cover comprising a trim ring and the inner margin engageable with the wheel body comprising a flange engageable in retaining relation by a hub cap margin, said vanes having edges retainingly engageable in press-on, pry-off relation with the tire rim.

7. In a wheel structure including a tire rim and a wheel body with openings through the wheel adjacent juncture of the wheel body and tire rim, a cover for disposition at the outer side of the wheel including an annular portion having an inner margin for close juncture cooperation with the wheel body radially inwardly from the wheel openings and diverging therefrom to an outer margin arranged to lie in substantially spaced air gap relation to the terminal portion of the tire rim and to afford an annular air gap between the tire rim and the wheel body adjacent to the tire rim and communicating with the wheel openings, and a plurality of vanes on the inner side of said cover portion extending from a radially inner end within the divergent juncture of the annular cover portion and the wheel body to a radially outer end adjacent to the terminal portion of the tire rim and between said ends conformably following the wheel body and the tire rim as well as the annular cover portion for thereby dividing the annular space into a plurality of substantially isolated chambers communicating with the wheel openings, said vanes being circumferentially angled to have an aspirating effect in rotary motion of the wheel in the opposite direction from the angling of the vanes and an air scooping effect in rotary motion of the wheel in the direction of angling of the vanes, the portions of the vanes that follow the tire rim having lug portions thereof for engaging an annular radially inwardly facing portion of the tire rim under edgewise expanding clutch like resilient tensioned grip whereby to hold the cover against turning on the wheel.

8. In a wheel structure including a wheel body and a tire rim with air circulation openings through the wheel body adjacent to the tire rim for movement therethrough of brake drum cooling air, a cover for disposition at the outer side of the wheel including an annular portion overlying in spaced relation the tire rim and the adjacent portion of the wheel body having the openings, and air circulation promoting vanes dividing the annular chamber between the cover and the tire rim and wheel body into a plurality of substantially isolated sub-chambers with which the wheel openings communicate, said vanes having edge portions thereof cooperating closely with the tire rim and the wheel body and being angled in a circumferential direction adapted to effect movement of air through said sub-chambers and openings in the rotation of the wheel, said vanes having edge portions thereof engaging grippingly directly under resilient tension with the tire rim.

References Cited in the file of this patent

UNITED STATES PATENTS

| 2,022,153 | Rogers | Nov. 26, 1935 |
| 2,441,008 | Chase | May 4, 1948 |
| 2,600,410 | Lyon | June 17, 1952 |
| 2,689,770 | Pipes | Sept. 21, 1954 |

FOREIGN PATENTS

| 682,948 | France | Feb. 24, 1930 |
| 787,597 | France | July 8, 1935 |
| 1,011,437 | France | Apr. 2, 1952 |

OTHER REFERENCES

Chrysler—"Brake Service" Magazine, volume 21, No. 5, May 1951, page 14.